June 1, 1954 F. E. WELD 2,680,150

SOUND REPRODUCING APPARATUS

Filed Nov. 28, 1951

INVENTOR.
FOSTER E. WELD
BY Kenway Jenney Witter & Hildreth
ATTORNEYS

Patented June 1, 1954 2,680,150

UNITED STATES PATENT OFFICE 2,680,150

SOUND REPRODUCING APPARATUS

Foster E. Weld, Newton Highlands, Mass., assignor to The Gamewell Company, Newton Upper Falls, Mass., a corporation of Massachusetts Application November 28, 1951, Serial No. 258,633

8 Claims. (Cl. 179—6)

Figure 1:
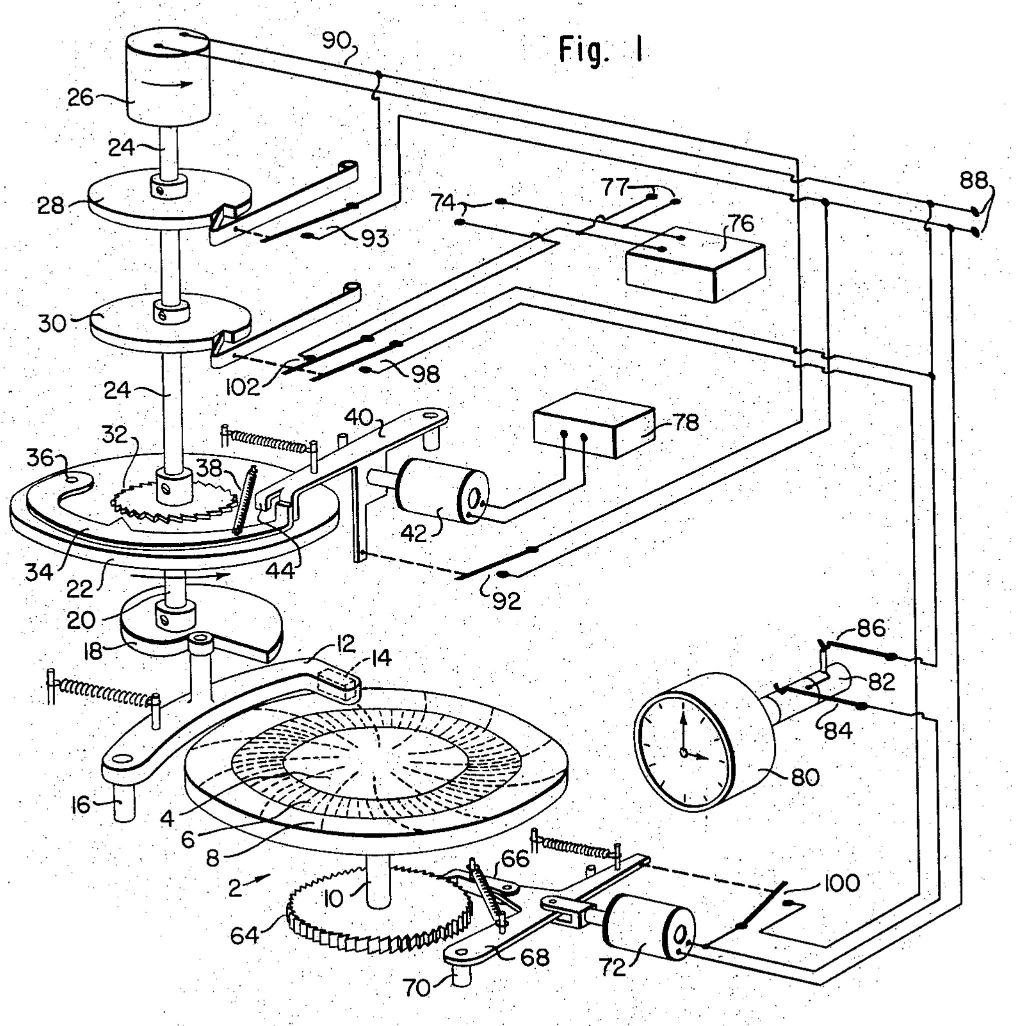

The present invention relates to audio frequency communications and more particularly to an automatically indexed announcing device suitable for insertion in an audio frequency communication line. Such devices are of particular utility in telephone circuits for informing a subscriber of the correct time, or for recording the time on the same recording medium with telephone conversations, as in fire or police installations. It will be evident that such devices may also be of utility in radio communications.

Heretofore, numerous devices have been proposed for producing permanent indicia of the time when certain recorded events occurred, such as time stamps or punches operative upon a recording tape. Also, various time announcing devices have been proposed and used such as a record disk bearing concentric, non-communicating grooves and a clock-driven reproducing head which is moved progressively to select the proper groove for reproduction.

Many of these devices, however, are of cumbersome or complicated construction, while most of them involve an undue duplication of parts. Experience has shown, moreover, that in many applications the best form for the time indicia is voice announcement, since such an announcement may either be inserted in a magnetic tape or other device for recording conversations, or indeed may be used to transmit any form of instantaneously intelligible audible information over a communication line.

It is a principal object of this invention to provide an automatically indexed announcing device of a type suitable for making a voice announcement of the correct time at any desired moment over a communication line.

Another object is to provide an automatically indexed announcing device having provision for preventing the interruption of an announcement while said indexing is in progress.

Another object is to provide a simple and compact phonographic signal synthesizing apparatus adapted to be indexed at discrete times to change the combination of reproduced signals.

Another object is to prevent the interruption of a time or other announcement by audio signals in the communication line.

With the above objects in view, a principal feature of the present invention is a novel form of reproducing apparatus including a number of concentrically arranged, relatively movable disk members and an arm to support a reproducing head and to cause the head to move over a circular arc, tracing a path over the surfaces of each of the disk members.

Another feature includes a cam-operated tone arm driven by a one-revolution clutch to trace an arc over the disk members when the clutch is energized.

Provision is also made for preventing audio interference with an announcement while the announcement is in progress. This feature may or may not be used in particular applications of the invention, and for this reason a simple change in the circuit connections makes possible its elimination.

Another feature is a simple provision by which the indexing of the disk members, which is normally brought about automatically by a clock, is prevented for the duration of any time announcement which may be in progress when the indexing operation would normally occur.

Figure 2:
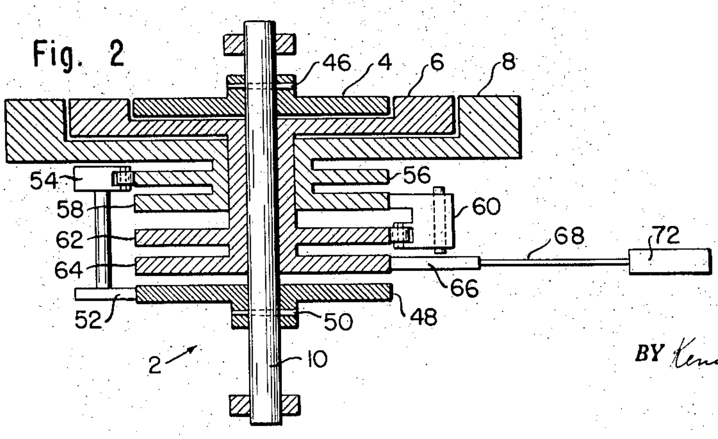

Other features and objects of the invention include certain mechanical arrangements and electrical circuits, the functions of which will be better understood in relation to the specification and drawings, in which Fig. 1 is a schematic view of apparatus and circuitry forming an entire time announcing device according to the invention; and Fig. 2 is a projection, partly in section, of the cam and ratchet assembly driving the record disks.

Referring to Fig. 1, the time record device is shown at 2 and comprises three concentric disks 4, 6 and 8. The disks are relatively movable about the axis of a shaft 10 in a manner which will be described at a later point in connection with Fig. 2. A tone arm 12 within which is mounted a reproducing head 14 rotates about a fixed axis 16. The reproducing head is caused to describe a circular arc, starting from a point on the outer disk 8 and ending at a point on the inner disk 4. The hours are recorded on the disk 8, the minutes on the disk 6, and "A.M.," and "P.M." on the disk 4.

The tone arm 12 is moved in the manner described above by a cam 18 fixed to a shaft 20. The shaft 20 is in turn fixed to a disk 22, which forms a part of a one-revolution clutch assembly. This assembly provides means whereby the shaft 20 may be connected with a shaft 24 for a period corresponding to no more than one revolution of the shaft 20. The shaft 24 is driven by an electric motor 26. Two cams 28 and 30 are fixed to the shaft 24, and their functions will be described hereinafter more fully in connection with the electrical circuit.

The one-revolution clutch assembly is of familiar construction. To the shaft 24 is fixed a toothed wheel 32, which may be engaged with a toothed projection on an arm 34 swiveled about an axis 36 in the plate 22. A spring 38 constantly urges the tooth toward the wheel, but they are kept out of engagement by an abutment on an arm 40. An electromagnet 42, when energized, rotates the arm so as to withdraw this abutment from contact with the arm 34. If the shaft 24 is rotating at this time (and it is assumed that rotation occurs only in the direction of the arrows in the figure), the disk 22 is carried by the wheel 32 until the arm 34 comes in contact with a second abutment 44 of the arm 40, which throws the arm 34 out of engagement with the wheel 32 and stops the shaft 20. When the magnet 42 is deenergized, the arm 34 merely slips off of the abutment 44 and causes the clutch to reach its initial condition, as shown.

Referring to Fig. 2, the structure of the record device 2 is next described. The disk 4 is pinned by a pin 46 to the shaft 10. A ratchet wheel 48 is also pinned to the shaft by a pin 50. A pawl 52 engages with the ratchet 48 and drives the ratchet whenever it is moved through the cooperation of a cam follower 54 with an hour cam 56. The hour cam is integral with the hour disk 8 and also with an hour ratchet 58. An hour pawl 60 engages with the ratchet 58, which it drives through the cooperation of a cam follower with a minute cam 62. The minute cam 62 is integral with the minute disk 6, and also with a ratchet wheel 64. The ratchet wheel 64 is driven by a pawl 66, which is also shown in Fig. 1. The pawl 66 is mounted on an arm 68, which may be rotated about a fixed axis 70 by the action of an electromagnet 72.

Thus, it will be seen that the record device 2 is essentially a clockwork mechanism, with the minute disk being indexed by 1/60 of a revolution, or 6 degrees, at one-minute intervals, and the hour disk being indexed by 1/12 of a revolution, or 30 degrees, at one-hour intervals by the movement of the pawl 60 as the minute disk moves from the "fifty-nine" to the "sixty" or "zero" position. The "A.M.-P.M." disk is also preferably indexed by 1/12 of a revolution, or 30 degrees, at twelve hour intervals by the movement of the pawl 52 as the hour disk moves from the "eleven" to the "twelve" position.

Referring to Fig. 1, there is shown a pair of terminals 74 representing the connection of the time announcing device with an external audio frequency communication line. These terminals lead through a break contact associated with the cam 30 to a recording device 76 which may be, for example, a tape recorder. A pair of terminals 77 represent the leads from the reproducing head 14. Obviously, a pre-amplifier may be inserted between the head and the terminals 77 to bring the reproducing level to a value comparable with that of the signals coming in over the external circuit.

The device which operates the electromagnet 42 is represented at 78. This may consist of any of a wide variety of devices, a simple form of which would be a momentary-contact type of push-button connecting the electromagnet 42 with a source of current.

A clock 80 is provided with a continuously rotating shaft 82, which rotates through a complete revolution once per minute. Thus, a brush 84 is connected electrically with a contact 86 for a brief interval once every minute.

The electrical source of energy for the time announcing device, which is applied through a pair of terminals 88, may supply either alternating or direct current.

The operation of the device will next be described in reference to Fig. 1. When the time announcing device is inoperative the terminals 74 carry voice messages to the recorder 76. At an appropriate moment, the device 78 is operated, thus causing the electromagnet 42 to be energized. The electromagnet 42 moves the arm 40, thus starting the motor 26 by connecting one of its leads 90 to one of the terminals 88 through a pair of make contacts 92 closed by a projection of the arm 40. The motor continues to rotate after the electromagnet 42 is deenergized and the contacts 92 opened, until the shaft 24 reaches a position where the cam 28 again opens a pair of make contacts 93, in parallel with the contacts 92.

The shaft 20 is also engaged with the shaft 24 through the one revolution clutch in the manner described above. The tone arm is caused to sweep over the three disks 4, 6 and 8, and the time announcement is connected with the recording device 76 through the terminals 77.

Once each minute the clock 80 causes the electromagnet 72 to be energized through the contact 86 and the brush 84. The energization of the electromagnet 72 causes the pawl 66 to be moved to the next tooth of the ratchet wheel 64. However, this motion in itself produces no motion of the wheel 64; it is only when the electromagnet 72 is deenergized that the wheel 64 is advanced to its next position.

From the description given above in reference to Fig. 2, the manner in which the time is recorded on the disks 4, 6 and 8 will be readily inferred. The minutes disk must be provided with 60 record tracks or strips, each track being in the arc of a circle, and the tracks being displaced from one another by 6°. The hour disk 8 is only required to have 12 separate tracks, and these may be spaced 30° apart. From Fig. 2 it is seen that the hour disk is driven from the minute disk, and it is also evident from the figure that the minute cam 62 must be so designed as to cause the hour disk to turn through 30° when the minute disk moves from its "59" to its "60" or "zero" position. As already indicated, the "A.M.-P.M." disk 4 is preferably advanced 30° each time the hour disk is advanced from "11" to "12," and the record tracks on this disk are alternately recorded with "A.M." and "P.M."

It will also be apparent that the device 78 may sometimes be operated so as to cause the tone arm 12 to be in the process of reproducing a time announcement at the moment when the clock 80 energizes the electromagnet 72 to cause an advancement of the minute disk. An electrical interlocking arrangement is preferably provided to prevent this possibility from causing the time announcement to be distorted. This circuit includes a pair of make contacts 98 associated with the cam 30, in series with a second pair of make contacts 100 closed by the arm 68 when it is rotated by the electromagnet 72. From the foregoing description it will be clear that during each time announcement the cam 30 will be rotating so as to cause the closure of the contacts 98. If, during the period that the contacts 98 are closed, the electromagnet 72 is also energized by the clock, the contacts 100 will also be closed, thus completing a circuit to the electromagnet 72, and preventing the deenergization of the electromagnet until after the tone arm has completed its cycle and the contacts 98 are opened by the return of the cam 30 to its initial position.

A pair of break contacts 102 associated with the cam 30 are open during each time announcement cycle. This breaks the connection of the terminals 74 with the recording device 76 and prevents the interference of external voice messages with the time announcement. In some cases, it will be found that the externally applied voice messages will have no effect upon the intelligibility of the time announcement, in which case the contacts 102 may simply be bridged so that the external messages will be connected continuously with the recording device during the time announcement.

From the foregoing description, it will be evident that the time announcing device which has been described is only representative of a variety of devices which may be constructed upon the principle of synthesizing sound messages from elemental sounds or combinations of sounds selectively arranged to form a line over which a reproducing head may pass. Other mechanisms such as coding mechanisms or counters might be used in place of the clock, and the recorded information might consist of elements of a coded announcement, or simply spoken numbers for use with a counting mechanism or other device for selectively reproducing numbers in the digital form.

It is also evident that, if the diameter of the disk bearing the records to be reproduced is great enough to allow the requisite spacing between adjacent recordings, a single disk or other record bearing device may be employed, with each of the announcements recorded thereon in its entirety, rather than on several disks.

By reason of the construction of the record device, including a number of disks whereby the tone arm passes from one disk to another during the course of the time announcement, it has been found that the simplest embodiment would employ magnetic recording tracks, rather than grooves adapted to cooperate with needles. The magnetic arrangement requires less critical registration of the disks, minimizes breakage, and also greatly limits the attenuation of the recordings by use or wear. It has been found, for example, that a sound record on magnetic tape has been reproduced more than 300,000 times with total signal loss approaching an asymptotic value 4.5 decibels.

The diameters of the record disks, as well as the speed of motion of the tone arm, are functions of the required fidelity of the apparatus. It has been found that acceptable lineal velocity of the reproducing head is in the neighborhood of six inches per second, with a total elapsed time for reproduction of a time announcement of about 1¼ seconds, which may be broken down into ¼ second for the hours, ½ second for the minutes, and ½ second for "A.M." or "P.M."

Having thus described my invention, I claim:

1. In apparatus for vocal time announcing, the combination of a record device including a number of concentric disks, each disk bearing a number of spaced sound tracks corresponding to elements of a time announcement, a clockwork having a continuously rotatable part, a switch operable once per revolution of said part, a magnetically-operated ratchet wheel and pawl device energized through said switch, means driven by said wheel and pawl device to move the disks differentially and intermittently when the switch is operated to cause selected tracks on said disks to form a continuous line, an arm to support a reproducing head in operable relation to said line, cam-operated mechanism for moving the arm, whereby the reproducing head traverses the entire line and reproduces a complete time announcement, and a circuit connected with the wheel and pawl device for preventing movement of the disks during movement of the cam-operated mechanism.

2. Apparatus according to claim 1 including a voice communication line, a recorder for recording voice messages on said line, connections from the reproducing head to the communication line to cause the recording of the time when said cam-operated mechanism is actuated, and relay means to interrupt external voice communications during said time recording.

3. A sound reproducing device comprising the combination of a movable record bearing a plurality of spaced sound tracks, a clockwork having a continuously rotatable part, a switch operable once per revolution of said part, a magnetically-operated ratchet wheel and pawl device energized through said switch, means driven by said wheel and pawl device to move the record intermittently to cause a selected track to reach a reproducing position, an arm to support a reproducing head in operable relation to said position, cam-operated mechanism for moving the arm, whereby the reproducing head traverses said selected track, and a circuit connected with the wheel and pawl device for preventing movement of the record during movement of the cam-operated mechanism.

4. Apparatus according to claim 3 including a voice communication line, a recorder for recording voice messages on said line, connections from the reproducing head to the communication line to cause the recording of the time when said cam-operated mechanism is actuated, and relay means to interrupt external voice communications during said time recording.

5. In apparatus for transmitting a sound message, a number of rigid, relatively rotatable members having contiguous coplanar surfaces, each surface bearing a number of congruent, arc-shaped, spaced sound tracks corresponding to elements of a message, mechanism operable to rotate the members differentially to form a continuous circular arc comprised of selected sound tracks corresponding to the elements of a message, and an arm to support a reproducer for movement in said arc in operative relation with said selected tracks.

6. In apparatus for transmitting a vocal time announcement, a number of rigid, relatively rotatable members having contiguous coplanar surfaces, each surface bearing a number of congruent, arc-shaped, spaced sound tracks corresponding to elements of a time announcement, a clockwork mechanism operable to rotate the members differentially and intermittently to form a continuous circular arc comprised of selected sound tracks corresponding to the elements of the current time, and an arm to support a reproducer for movement in said arc in operative relation with said selected tracks.

7. Apparatus according to claim 6 in which the clockwork mechanism includes a clock, a magnetically-operated ratchet wheel and pawl device periodically energized by the clock, and means driven by said wheel and pawl device to move the members differentially.

8. In apparatus for transmitting a vocal time announcement, a number of rigid members having coplanar surfaces contiguous along circular lines having a common center, each surface bearing a number of congruent, arc-shaped, spaced sound tracks corresponding to elements of a time announcement, a clockwork mechanism operable to rotate the members differentially and intermittently to form a continuous circular arc comprised of selected sound tracks corresponding to the elements of the current time, and an arm to support a reproducer for movement in said arc in operative relation with said selected tracks.

References Cited in the file of this patent

UNITED STATES PATENTS

| Number | Name | Date |
|---|---|---|
| 1,936,700 | Wells | Nov. 28, 1933 |